United States Patent
Nakagawa

(10) Patent No.: US 12,024,182 B2
(45) Date of Patent: Jul. 2, 2024

(54) VEHICLE CONTROL APPARATUS, VEHICLE CONTROL METHOD, AND VEHICLE CONTROL SYSTEM

(71) Applicant: Hitachi Automotive Systems, Ltd., Hitachinaka (JP)

(72) Inventor: Satoshi Nakagawa, Hadano (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 579 days.

(21) Appl. No.: 16/979,772

(22) PCT Filed: Jan. 23, 2019

(86) PCT No.: PCT/JP2019/002004
§ 371 (c)(1),
(2) Date: Sep. 10, 2020

(87) PCT Pub. No.: WO2019/176301
PCT Pub. Date: Sep. 19, 2019

(65) Prior Publication Data
US 2021/0016785 A1 Jan. 21, 2021

(30) Foreign Application Priority Data
Mar. 12, 2018 (JP) ................................ 2018-043953

(51) Int. Cl.
*B60W 50/023* (2012.01)
*B60T 7/12* (2006.01)
(Continued)

(52) U.S. Cl.
CPC ............. *B60W 50/023* (2013.01); *B60T 7/12* (2013.01); *B60T 17/18* (2013.01); *B60W 50/045* (2013.01);
(Continued)

(58) Field of Classification Search
CPC .......... B60G 2600/08; B60G 2600/086; B60L 3/0092; B60T 2270/40; B60T 2270/402;
(Continued)

(56) References Cited

U.S. PATENT DOCUMENTS 6,476,515 B1    11/2002  Yamamoto et al.
11,046,330 B1 *  6/2021  Katzourakis .......... B60W 10/04
(Continued)

FOREIGN PATENT DOCUMENTS

CN    103492247 A     1/2014
CN    107908186 B  *  7/2021 ............. G05D 1/021
(Continued)

OTHER PUBLICATIONS

CN107908186 (English trans of Description) (Year: 2017).*
(Continued)

*Primary Examiner* — Ian Jen
*Assistant Examiner* — Renee LaRose
(74) *Attorney, Agent, or Firm* — Crowell & Moring LLP

(57) ABSTRACT

An object of the present invention is to prevent a cost increase and an increase in an installation space due to a redundant arrangement of a vehicle motion control apparatus. A vehicle control apparatus includes an input portion configured to receive an input of a target state from a vehicle motion control controller equipped with a first vehicle motion control function configured to determine the target state for achieving a target route input from an autonomous driving controller, a first control portion configured to control a motion state based on the target state input from the input portion, and a second control portion equipped with a second vehicle motion control function configured to determine the target state for achieving the target route input from
(Continued)

the autonomous driving controller and configured to control the motion state based on the target state input from the input portion.

7 Claims, 11 Drawing Sheets

(51) Int. Cl.
 *B60T 17/18* (2006.01)
 *B60W 50/04* (2006.01)
(52) U.S. Cl.
 CPC ..... *B60T 2270/40* (2013.01); *B60T 2270/413* (2013.01); *B60W 2510/18* (2013.01)
(58) Field of Classification Search
 CPC ......... B60T 2270/411; B60T 2270/413; B60T 2270/414; B60T 2270/415; B60T 2270/416; B60W 2050/021; B60W 2050/0215; B60W 2050/022; B60W 2050/0292; B60W 2050/0295; B60W 2050/0297; B60W 50/02; B60W 50/0205; B60W 50/0225; B60W 50/023; B60W 50/029; B63B 2241/22; F02D 2400/08; F05B 2260/845; F05D 2260/84; F05D 2270/46; F16D 2500/51; F16D 2500/5108; F16D 2500/5112; F16D 2500/5114; F16H 2061/122; F16H 61/12; H02H 3/02; H02H 3/05; H04B 1/74; Y10S 477/906; Y10S 477/907

See application file for complete search history.

(56) References Cited

U.S. PATENT DOCUMENTS

| | | | |
|---|---|---|---|
| 2007/0213916 A1* | 9/2007 | Sugano | B60W 50/16 |
| | | | 701/96 |
| 2014/0110997 A1 | 4/2014 | Biller et al. | |

FOREIGN PATENT DOCUMENTS

| | | |
|---|---|---|
| JP | 2001-138882 A | 5/2001 |
| JP | 2006-193156 A | 7/2006 |
| JP | 2017-121851 A | 7/2017 |

OTHER PUBLICATIONS

Chinese-language Office Action issued in Chinese Application No. 201980011819.9 dated May 13, 2022 with partial English translation (19 pages).

International Search Report (PCT/ISA/210) issued in PCT Application No. PCT/JP2019/002004 dated Apr. 16, 2019 with English translation (four (4) pages).

Written Opinion (PCT/ISA/237) issued in PCT Application No. PCT/JP2019/002004 dated Apr. 16, 2019 (10 pages).

* cited by examiner

VEHICLE CONTROL APPARATUS, VEHICLE CONTROL METHOD, AND VEHICLE CONTROL SYSTEM

TECHNICAL FIELD

The present invention relates to a vehicle control apparatus, a vehicle control method, and a vehicle control system, and, more particularly, to a technique for achieving a redundant arrangement of a control system.

BACKGROUND ART

PTL 1 discloses a vehicle motion control system that calculates an availability corresponding to a controllable range including a maximum control amount and a control amount change range of a controlled object, compares the availability and a control target value, and determines whether to perform vehicle motion control by controlling the controlled object based on a result of the comparison.

CITATION LIST

Patent Literature

[PTL 1] Japanese Patent Application Public Disclosure No. 2006-193156

SUMMARY OF INVENTION

Technical Problem

Then, when an error has occurred in the calculation due to a software abnormality of an application or a control platform, the vehicle motion control system disclosed in PTL 1 may be unable to transmit a final request value to various kinds of managers on the downstream side, thereby making the vehicle immobile.

Now, employing a redundant arrangement for the control system allows the normal control to continue by another control system even when a calculation error or the like has occurred, but raises a problem such as a cost increase and an increase in the installation space of the vehicle control apparatus due to the redundant arrangement.

An object of the present invention to provide a vehicle control apparatus, a vehicle control method, and a vehicle control system capable of preventing the cost increase and the increase in the installation space due to the redundant arrangement.

Solution to Problem

According to one aspect of the present invention, a vehicle control apparatus includes an input portion configured to receive an input of a target state from a vehicle motion control controller equipped with a first vehicle motion control function configured to determine the target state for achieving a target route input from an autonomous driving controller, a first control portion configured to control a motion state based on the target state input from the input portion, and a second control portion configured to control the motion state based on the target state input from the input portion and equipped with a second vehicle motion control function configured to determine the target state for achieving the target route input from the autonomous driving controller.

According to the above-described aspect, the vehicle control apparatus can prevent the cost increase and the increase in the installation space due to the redundant arrangement.

DESCRIPTION OF EMBODIMENTS

In the following description, embodiments of a vehicle control apparatus, a vehicle control method, and a vehicle control system according to the present invention will be described with reference to the drawings.

Figure 1:
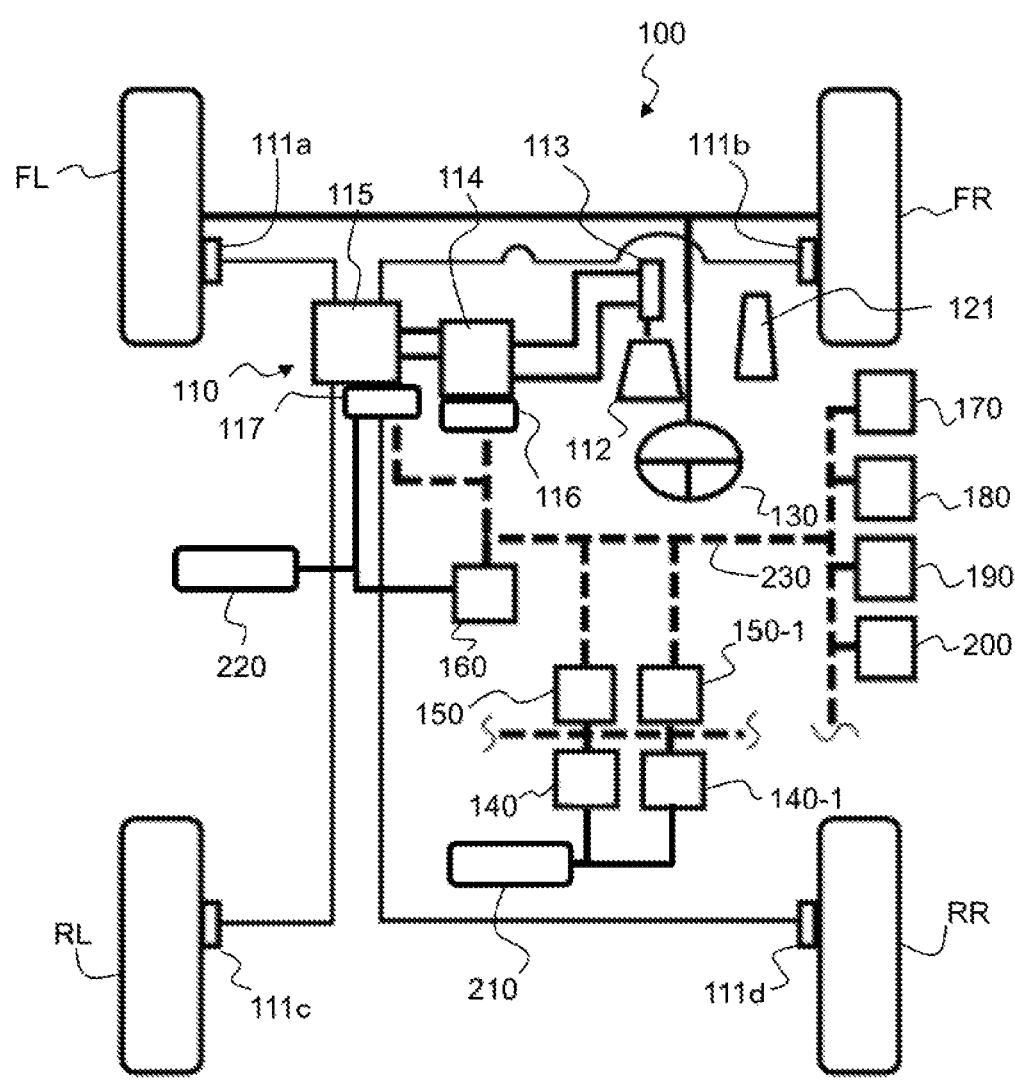
FIG. 1 is a block diagram illustrating a system configuration of a vehicle.

FIG. 1 illustrates a configuration of a vehicle according to the embodiments of the present invention.

A vehicle 100 illustrated in FIG. 1 is a four-wheeled vehicle including a front left wheel FL, a front right wheel FR, a rear left wheel RL, and a rear right wheel RR.

The vehicle 100 includes a vehicle braking apparatus 110, which applies a frictional braking torque derived from a hydraulic pressure to each of the wheels.

The vehicle braking apparatus 110 includes wheel cylinders 111a to 111d mounted on the wheels FL, FR, RL, and RR, respectively, a brake pedal 112 as a brake operation member, a master cylinder 113, a first hydraulic unit 114, a second hydraulic unit 115, a first braking control device 116, which controls the first hydraulic unit 114, and a second braking control device 117, which controls the second hydraulic unit 115.

However, the vehicle braking apparatus 110 is not limited to the apparatus that generates the frictional braking force according to the hydraulic pressure, and can be, for example, an electric brake system that directly actuates the brake with use of a motor.

The first hydraulic unit 114 includes two hydraulic circuit systems, a primary system and a secondary system connected to a primary pressure chamber and a secondary pressure chamber of the master cylinder 113, respectively, and also includes a first electric pump and a plurality of electromagnetic valves disposed in hydraulic passages forming the hydraulic circuits.

The first braking control device 116 adjusts hydraulic pressures in the two systems, the primary system and the secondary system by controlling the first electric pump and the plurality of electromagnetic valves in the first hydraulic unit 114.

Then, the first hydraulic unit 114 and the first braking control device 116 form a first braking device.

The second hydraulic unit 115 includes two hydraulic circuit systems, a primary system and a secondary system connected to the two hydraulic circuit systems of the first hydraulic unit 114, respectively, and also includes a second electric pump and a plurality of electromagnetic valves disposed in hydraulic passages forming the hydraulic circuits and supplies a hydraulic pressure to each of the wheel cylinders 111a to 111d.

The second braking control device 117 has a function of individually adjusting the hydraulic pressures to supply to the wheel cylinders 111a to 111d, respectively, by controlling the second electric pump and the plurality of electromagnetic valves in the second hydraulic unit 115.

Then, the second hydraulic unit 115 and the second braking control device 117 form a second braking device, and also realize the electronic stability control (ESC: Electronic Stability Control) such as sideslip prevention with the aid of the function of individually adjusting the hydraulic pressures to supply to the wheel cylinders 111a to 111d, respectively.

An engine torque operation member 121, such as an accelerator pedal, adjusts a torque to be generated by a not-illustrated engine.

A power steering control apparatus 130 is an apparatus that controls a steering force provided to a steering mechanism represented by an electric power steering.

Figure 2:
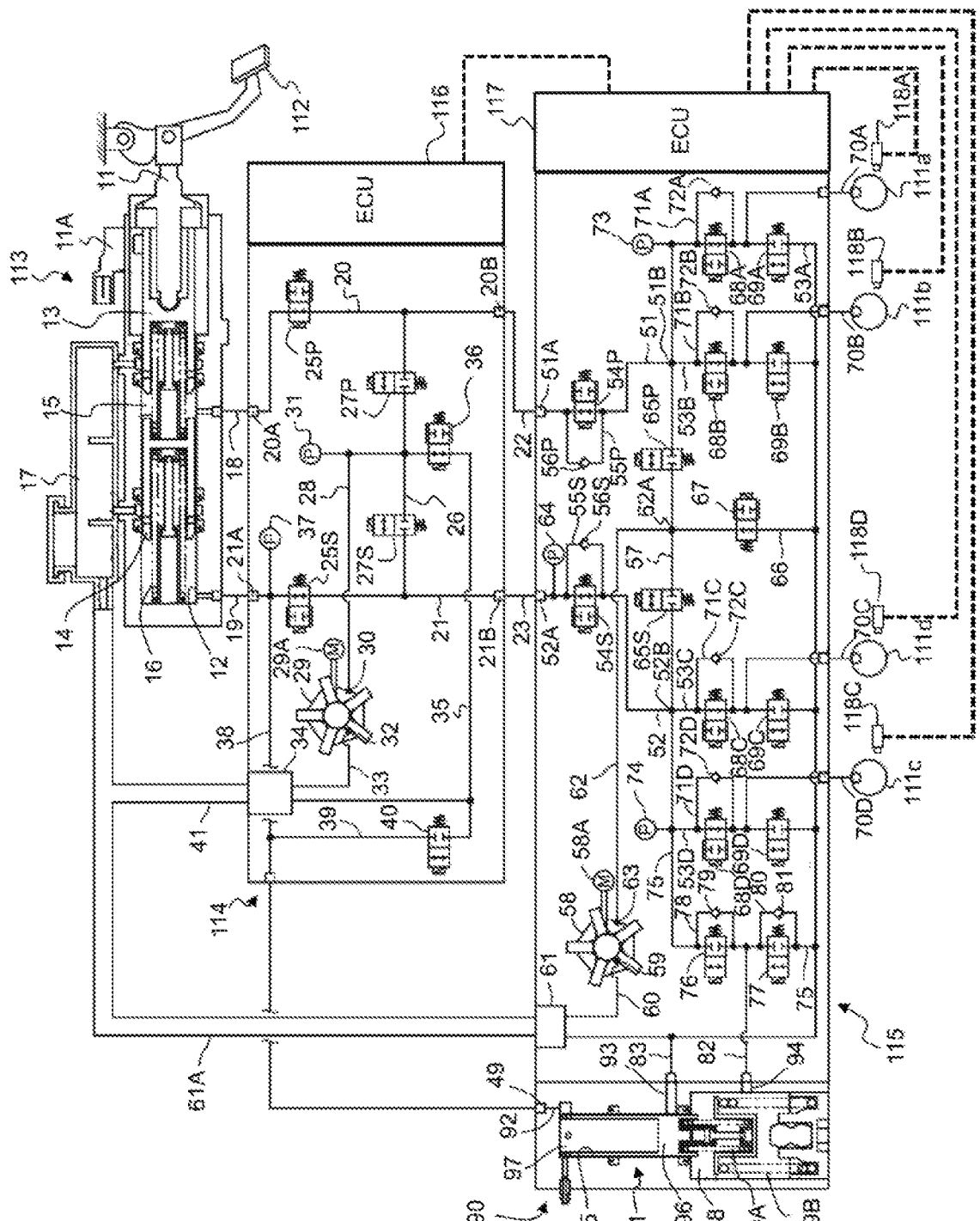
FIG. 2 illustrates a configuration of a vehicle control apparatus.

FIG. 2 illustrates configurations of the master cylinder 113, the first hydraulic unit 114, and the second hydraulic unit 115 of the vehicle braking apparatus 110.

In FIG. 2, the master cylinder 113 is connected to the brake pedal 112 via an input rod 11, and generates a master cylinder hydraulic pressure according to an operation performed by a driver of the vehicle 100 on the brake pedal 112.

The master cylinder 113 includes a primary piston 13 and a secondary piston 14, which axially move in a cylinder 12 according to the operation on the brake pedal 112, and these two pistons 13 and 14 define a primary hydraulic chamber 15 and a secondary hydraulic chamber 16 inside the cylinder 12.

The hydraulic chambers 15 and 16 are replenished with the brake fluid from a reservoir tank 17, and generate a primary hydraulic pressure and a secondary hydraulic pressure by the movements of the pistons 13 and 14, respectively.

The master cylinder 113 does not include a booster (a brake booster) that boosts the brake operation force by utilizing, for example, an intake negative pressure generated by the internal combustion engine.

A stroke sensor 11A detects the stroke amount of the brake pedal 112.

A primary pipe 18 and a secondary pipe 19 connect the master cylinder 113 and the first hydraulic unit 114 to each other.

The primary hydraulic chamber 15 of the master cylinder 113 and an input end 20A of a primary fluid passage 20 of the first hydraulic unit 114 are in communication with each other via the primary pipe 18.

On the other hand, the secondary hydraulic chamber 16 of the master cylinder 113 and an input end 21A of a secondary fluid passage 21 of the first hydraulic unit 114 are in communication with each other via the secondary pipe 19.

Further, a primary pipe 22 and a secondary pipe 23 connect the first hydraulic unit 114 and the second hydraulic unit 115 to each other.

Then, an output end 20B of the primary fluid passage 20 of the first hydraulic unit 114 is connected to the primary pipe 22, and an output end 21B of the secondary fluid passage 21 of the first hydraulic unit 114 is connected to the secondary pipe 23.

The primary fluid passage 20 of the first hydraulic unit 114 includes a first shut-off valve 25P, and the secondary fluid passage 21 includes a first shut-off valve 25S.

The first shut-off valve 25P and the second shut-off valve 25S are each a normally-opened proportional electromagnetic valve, which is opened when no electric power is supplied thereto.

The first shut-off valve 25P adjusts the flow state of the brake fluid in the primary fluid passage 20, and the first shut-off valve 25S adjusts the flow state of the brake fluid in the secondary fluid passage 21.

A discharge fluid passage 26 establishes the communication between the primary fluid passage 20 downstream of the first shut-off valve 25P and the secondary fluid passage 21 downstream of the first shut-off valve 25S.

A first pump 29 is an electric pump driven by a motor 29A serving as a driving source thereof, and an intake fluid passage 33 connects an intake port 32 of the first pump 29 and an inner reservoir 34 to each other. Then, the first pump 29 sucks and discharges the brake fluid stored in the inner reservoir 34.

A discharge fluid passage 28 establishes the communication between the discharge fluid passage 26 and a discharge port 30 of the first pump 29.

The discharge fluid passage 28 includes a discharge pressure sensor 31, which detects the discharge pressure of the first pump 29.

The discharge fluid passage 26 between the primary fluid passage 20 and a connection portion where the discharge fluid passage 28 is connected to the discharge fluid passage 26 includes a first communication valve 27P.

Further, the discharge fluid passage 26 between the secondary fluid passage 21 and the connection portion where the discharge fluid passage 28 is connected to the discharge fluid passage 26 includes a first communication valve 27S.

The first communication valve 27P and the first communication valve 27S are each a normally-closed ON/OFF electromagnetic valve, which is closed when no electric power is supplied thereto.

The first communication valve 27P adjusts the inflow of the brake fluid discharged from the first pump 29 into the primary fluid passage 20, and the first communication valve 27S adjusts the inflow of the brake fluid discharged from the first pump 29 into the secondary fluid passage 21.

Further, a return flow fluid passage 35 establishes the communication between the inner reservoir 34 and the discharge fluid passage 26 between the first communication valve 27P and the first communication valve 27S.

The return flow fluid passage 35 includes a first pressure adjustment valve 36. The first pressure adjustment valve 36 is a normally-opened proportional electromagnetic control valve, which is opened when no electric power is supplied thereto.

A master cylinder hydraulic sensor 37 detects the hydraulic pressure in the secondary fluid passage 21 upstream of the first shut-off valve 25S as the master cylinder hydraulic pressure.

Further, a positive pressure fluid passage 38 establishes the communication between the secondary fluid passage 21 upstream of the first shut-off valve 25S and a positive pressure port 49 of the second hydraulic unit 115 (a simulator unit 90).

A communication fluid passage 39 establishes the communication between the return flow fluid passage 35 and the positive pressure fluid passage 38.

The communication fluid passage 39 includes a stroke valve 40. The stroke valve 40 is a normally-closed ON/OFF electromagnetic valve, which is closed when no electric power is supplied thereto.

The inner reservoir 34 of the first hydraulic unit 114 is in communication with the reservoir tank 17 of the master cylinder 113 via a reservoir pipe 41.

An input end 51A of a primary fluid passage 51 of the second hydraulic unit 115 is connected to the primary pipe 22, and an output end 51B of the primary fluid passage 51 branches off into a first connection fluid passage 53A and a second connection fluid passage 53B.

An input end 52A of a secondary fluid passage 52 of the second hydraulic unit 115 is connected to the secondary pipe 23, and an output end 52B of the secondary fluid passage 52 branches off into a third connection fluid passage 53C and a fourth connection fluid passage 53D.

The primary fluid passage 51 includes a second shut-off valve 54P, and the secondary fluid passage 52 includes a second shut-off valve 54S.

The second shut-off valve 54P and the second shut-off valve 54S are each a normally-opened proportional electromagnetic valve, which is opened when no electric power is supplied thereto.

The second shut-off valve 54P adjusts the flow state of the brake fluid in the primary fluid passage 51, and the second shut-off valve 54S adjusts the flow state of the brake fluid in the secondary fluid passage 52.

A bypass fluid passage 55P, which bypasses the second shut-off valve 54P, includes a check valve 56P. The check valve 56P permits the flow of the brake fluid directed from the input terminal 51A to the output terminal 51B, and blocks the flow of the brake fluid directed from the output terminal 51B to the input terminal 51A.

A bypass fluid passage 55S, which bypasses the second shut-off valve 54S, includes a check valve 56S. The check valve 56S permits the flow of the brake fluid directed from the input terminal 52A to the output terminal 52B, and blocks the flow of the brake fluid directed from the output terminal 52B to the input terminal 52A.

A discharge fluid passage 57 connects the output terminal 51B of the primary fluid passage 51 (a branch point between the first connection fluid passage 53A and the second connection fluid passage 53B) and the output terminal 52B of the secondary fluid passage 52 (a branch point between the third connection fluid passage 53C and the fourth connection fluid passage 53D) to each other.

A second pump 58 is an electric pump driven by a motor 58A serving as a driving source thereof, and an intake fluid passage 60 connects an intake port 59 of the second pump 58 and an inner reservoir 61 to each other. Then, the second pump 58 sucks and discharges the brake fluid stored in the inner reservoir 61.

The inner reservoir 61 of the second hydraulic unit 115 is in communication with the reservoir tank 17 of the master cylinder 113 via a reservoir pipe 61A.

A discharge fluid passage 62 establishes the communication between the discharge fluid passage 57 and a discharge port 63 of the second pump 58.

A master cylinder hydraulic sensor 64 detects the hydraulic pressure in the secondary fluid passage 52 upstream of the second shut-off valve 54S as the master cylinder hydraulic pressure.

The discharge fluid passage 57 between the primary fluid passage 51 and a connection portion 62A where the discharge fluid passage 62 is connected to the discharge fluid passage 57 includes a second communication valve 65P.

Further, the discharge fluid passage 57 between the secondary fluid passage 52 and the connection portion 62A includes a second communication valve 65S.

The second communication valve 65P and the second communication valve 65S are each a normally-closed ON/OFF electromagnetic valve, which is closed when no electric power is supplied thereto.

The second communication valve 65P adjusts the inflow of the brake fluid discharged from the second pump 58 into the first connection fluid passage 53A and the second connection fluid passage 53B, and the second communication valve 65S adjusts the inflow of the brake fluid discharged from the second pump 58 into the third connection fluid passage 53C and the fourth connection fluid passage 53D.

Further, a return flow fluid passage 66 establishes the communication between the inner reservoir 61 and the discharge fluid passage 57 (the connection portion 62A) between the second communication valve 65P and the second communication valve 65S.

The return flow fluid passage 66 includes a second pressure adjustment valve 67. The second pressure adjustment valve 67 is a normally-opened proportional electromagnetic control valve, which is opened when no electric power is supplied thereto.

The downstream ends of the first connection fluid passage 53A, the second connection fluid passage 53B, the third connection fluid passage 53C, and the fourth connection fluid passage 53D are connected to the return flow fluid passage 66 downstream of the second pressure adjustment valve 67.

The first connection fluid passage 53A includes a supply valve 68A, and also includes a relief valve 69A downstream of the supply valve 68A.

The second connection fluid passage 53B includes a supply valve 68B, and also includes a relief valve 69B downstream of the supply valve 68B.

The third connection fluid passage 53C includes a supply valve 68C, and also includes a relief valve 69C downstream of the supply valve 68C.

The fourth connection fluid passage 53D includes a supply valve 68D, and also includes a relief valve 69D downstream of the supply valve 68D.

The supply valves 68A to 68D are each a normally-opened proportional electromagnetic control valve, which is opened when no electric power is supplied thereto.

The relief valves 69A to 69D are each a normally-closed ON/OFF electromagnetic valve, which is closed when no electric power is supplied thereto.

Wheel cylinder pipes 70A to 70D branch off from the connection fluid passages 53A to 53D between the supply valves 68A to 68D and the relief valves 69A to 69D, and are connected to the wheel cylinders 111a to 111d, respectively.

Bypass fluid passages 71A to 71D, which bypass the supply valves 68A to 68D, include check valves 72A to 72D, respectively.

The check valves 72A to 72D permit the flows of the brake fluid directed from the wheel cylinders 111a to 111d (the relief valves 69A to 69D) to the second shut-off valves 54P and 54S, and block the flows of the brake fluid directed from the second shut-off valves 54P and 54S to the wheel cylinders 111a to 111d (the relief valves 69A to 69D), respectively.

A wheel cylinder hydraulic sensor 73 detects the hydraulic pressure in the first connection fluid passage 53A upstream of the supply valve 68A as the wheel cylinder hydraulic pressure in the primary system.

A wheel cylinder hydraulic sensor 74 detects the hydraulic pressure in the fourth connection fluid passage 53D upstream of the supply valve 68D as the wheel cylinder hydraulic pressure in the secondary system.

A simulator fluid passage 75 branches off from the fourth connection fluid passage 53D upstream of the supply valve 68D, and is connected to the return flow fluid passage 66.

The simulator fluid passage 75 includes a simulator supply valve 76, and also includes a simulator relief valve 77 downstream of the simulator supply valve 76.

The simulator supply valve 76 and the simulator relief valve 77 are each a normally-closed ON/OFF electromagnetic valve, which is closed when no electric power is supplied thereto.

A bypass fluid passage 78, which bypasses the simulator supply valve 76, includes a check valve 79, and a bypass fluid passage 80, which bypasses the simulator relief valve 77, includes a check valve 81.

The check valve 79 and the check valve 81 permit the flow of the brake fluid directed from the return flow fluid passage 66 to the second shut-off valve 54S, and block the flow of the brake fluid directed from the second shut-off valve 54S to the return flow fluid passage 66.

A back-pressure fluid passage 82 branches off from the simulator fluid passage 75 between the simulator supply valve 76 and the simulator relief valve 77, and is connected to the simulator unit 90.

A replenishment fluid passage 83 branches off from the return flow fluid passage 66, and is connected to the simulator unit 90.

The simulator unit 90 of the second hydraulic unit 115 includes the stroke simulator 91, a positive-pressure fluid passage 92, a replenishment fluid passage 93, and a back-pressure fluid passage 94, besides the positive pressure port 49.

The stroke simulator 91 generates a pedal stroke and applies a reaction force to the brake pedal 112 at the same time according to the operation of pressing the brake pedal 112 by the driver (the brake operation).

The stroke simulator 91 includes a cylinder 95, a piston 96, a positive pressure chamber 97, a back-pressure chamber 98, a first spring 99A, and a second spring 99B.

The piston 96 divides the inside of the cylinder 95 into the positive pressure chamber 97 and the back-pressure chamber 98.

The first spring 99A and the second spring 99B bias the piston 96 in the direction for reducing the volume of the positive pressure chamber 97.

The positive pressure chamber 97 is in communication with the secondary fluid passage 21 upstream of the first shut-off valve 25S via the positive pressure fluid passage 38, the positive pressure port 49, and the positive pressure fluid passage 92.

The back-pressure chamber 98 is in communication with the simulator fluid passage 75 between the simulator supply valve 76 and the simulator relief valve 77 via the back-pressure fluid passage 82 and the back-pressure fluid passage 94.

When the brake fluid flows from the secondary hydraulic chamber 16 of the master cylinder 113 into the positive pressure chamber 97 according to the operation of pressing the brake pedal 112 by the driver (the brake operation), the pedal stroke is generated and the brake operation reaction force is also generated due to the biasing forces of the first spring 99A and the second spring 99B.

Further, the vehicle braking apparatus 110 includes rotational speed sensors 118A to 118D, which detect rotational speeds of the wheels FL, FR, RL, and RR, respectively.

The rotational speed sensors 118A to 118D are one of sensors forming a vehicle motion state detection sensor 220, which will be described below.

The first braking control device 116 outputs a control signal to each of the electromagnetic valves included in the first hydraulic unit 114, and also outputs a driving signal to the motor 29A.

The second braking control device 117 outputs a control signal to each of the electromagnetic valves included in the second hydraulic unit 115, and also outputs a driving signal to the motor 58A.

Then, the second braking control device 117 has the function as the electronic stability control (ESC: Electronic Stability Control) for assisting the avoidance of a sideslip and improving the traction of the vehicle by controlling the braking force to generate on each of the wheels individually as software.

The first braking control device 116 does not have the function of individually controlling the braking force to generate on each of the wheels (the ESC function), but the vehicle braking apparatus 110 is configured to be able to apply a requested brake hydraulic pressure to each of the wheels to generate the braking force for deceleration by the first braking control device 116 even when an abnormality has occurred in the second braking control device 117.

Further, the vehicle braking apparatus 110 includes the two hydraulic circuit systems, the first hydraulic unit 114 and the second hydraulic unit 115, thereby being able to secure the braking force even at the time of a mechanical failure such as a failure in the electromagnetic valves.

In this manner, the vehicle braking apparatus 110 is a dual-system braking apparatus (a dual-system vehicle control apparatus) using a combination of the second braking control device 117 and the second hydraulic unit 115 as a main device and using a combination of the first braking control device 116 and the first hydraulic unit 114 as a sub device (a redundant device or a backup device).

Now, the operation of the vehicle braking apparatus 110 when the brake operation is performed by the driver will be described.

When the brake operation is performed by the driver, the first braking control device 116 controls the first shut-off valves 25P and 25S into the valve-closed states, thereby blocking the flow of the brake fluid between the master cylinder 113 and the first hydraulic unit 114.

On the other hand, the first braking control device 116 or the second braking control device 117 actuates the first pump 29 or the second pump 58 (the motor 29A or the motor 58A), and proportionally controls the first pressure adjustment valve 36 or the second pressure adjustment valve 67 so as to generate a target wheel cylinder hydraulic pressure according to the pedal stroke amount.

The target wheel cylinder hydraulic pressure is a wheel cylinder hydraulic pressure that realizes an ideal relational characteristic between the pedal stroke amount and the brake hydraulic pressure requested by the driver (a deceleration G requested by the driver).

Further, the second braking control device 117 controls the simulator relief valve 77 into the valve-opened state, thereby establishing the state capable of discharging the brake fluid from the back-pressure chamber 98 of the stroke simulator 91 and causing the stroke simulator 91 to function.

By this operation, the vehicle braking apparatus 110 can realize the deceleration G according to the driver's request while reducing the driver's brake operation, and, further, can realize a natural brake feeling.

The first braking control device 116 controls the stroke valve 40 into the valve-opened state, thereby securing the pedal stroke, when the simulator relief valve 77 becomes unable to be opened.

The description will continue referring back to FIG. 1.

The vehicle 100 is equipped with the autonomous driving technique, i.e., an autonomous driving control system as a vehicle control system.

An autonomous driving control apparatus 140 included in the autonomous driving control system is an apparatus that has a function of acquiring information regarding a target route (a target trajectory) of the vehicle 100 based on, for example, external world information about the vehicle 100 that is acquired by an external world recognition portion 210 and outputting the information regarding the target route during the autonomous driving (the automatic driving) of the vehicle 100.

An autonomous driving control apparatus 140-1 is a redundant apparatus (i.e., a spare device or a redundant configuration) for the autonomous driving control apparatus 140, and has a function of acquiring the information regarding the target route of the vehicle 100 based on, for example, the external world information.

In other words, the autonomous driving control apparatus 140 and the autonomous driving control apparatus 140-1 are both autonomous driving controllers that calculate and output the information regarding the target route of the vehicle 100, and the autonomous driving controllers are redundantly arranged control apparatuses formed by two controller systems.

Then, the autonomous driving control apparatuses 140 and 140-1 are configured to continue the autonomous driving based on the information regarding the target route that is calculated by the autonomous driving control apparatus 140-1 when an abnormality has occurred in the function of calculating and outputting the information regarding the target route by the autonomous driving control apparatus 140 and the autonomous driving control apparatus 140 becomes unable to correctly output the information regarding the target route.

The autonomous driving control apparatus 140-1 can have a similar function to the autonomous driving control apparatus 140, but can also have a part of the function of the autonomous driving control apparatus 140 or a function simplified from the function of the autonomous driving control apparatus 140.

A communication data gateway apparatus 150 is an apparatus that has a function of controlling the communication between the autonomous driving control apparatuses 140 and 140-1 and another vehicle control apparatus that controls the autonomous driving based on the information regarding the target route that is calculated by the autonomous driving control apparatus 140 or 140-1.

A communication data gateway apparatus 150-1 is a redundant apparatus for the communication data gateway apparatus 150, and has a function of controlling the communication between the autonomous driving control apparatuses 140 and 140-1 and the other vehicle control apparatus.

In other words, the autonomous driving control apparatuses 140 and 140-1 communicate with the vehicle control device in the other autonomous driving control system via the communication data gateway apparatus 150 or the communication data gateway apparatus 150-1.

A dotted line in FIG. 1 represents an in-vehicle network 230, such as a CAN (Control Area Network).

A vehicle motion control apparatus (VMC: Vehicle Motion Controller) 160 is a vehicle motion control controller equipped with, as software, a function of determining a target state of the vehicle 100 for achieving the target route based on the information regarding the target route that is input from the autonomous driving control apparatus 140 or the autonomous driving control apparatus 140-1 and a physical amount regarding the driving state of the vehicle 100 that is input from a vehicle motion state detection sensor 220.

More specifically, the vehicle motion control apparatus 160 is a controller that integrally controls the driving force, the brake, the steering, and the like to achieve the target route, and determines a tire generation force on each of the wheels in consideration of a tire load, assigns a role to each of the actuators based thereon, and outputs an instruction directed to each of the actuators (an operation instruction with respect to the braking/driving force, the steering, or the like).

The vehicle motion state detection sensor 220 is a sensor that detects various kinds of physical amounts regarding the motion state of the vehicle 100, including a sensor that detects the running speed, the yaw rate, or the like, the rotational speed sensors 118A to 118D illustrated in FIG. 2, and the like.

The target state of the vehicle 100 that is calculated by the vehicle motion control apparatus 160 includes the braking/driving force to be generated on each of the wheels, the steering angles of the front and rear wheels, and the like. Then, the vehicle motion control apparatus 160 transmits the information regarding the calculated target state to vehicle control apparatuses that control the various kinds of actuators via the in-vehicle network 230.

The vehicle control apparatuses that input the information (the control instruction) regarding the target state from the vehicle motion control apparatus 160 include the power steering control apparatus 130, the power train control apparatus 170, which controls the engine and the transmission, the rear-wheel steering control apparatus 180, which controls the steering of the rear wheels, the electronically-controlled suspension control apparatus 190, which controls the damping force of the shock absorber, an electric parking brake control apparatus 200, which controls the application/release of the parking brake, and the like, besides the above-described vehicle braking apparatus 110.

Each of the above-described vehicle control apparatuses 140, 140-1, 116, 117, 160, 170, 180, 190, and 200 is an electronic control apparatus (ECU: Electronic Control Unit) that includes a communication circuit for carrying out communication via the in-vehicle network 230, and a microcomputer having a CPU, a ROM, a RAM, and an input/output port device. Then, the vehicle control apparatuses 116, 117, 160, 170, 180, 190, and 200, which control the actuators, each further include a driving circuit of the actuator and the like.

Figure 3:
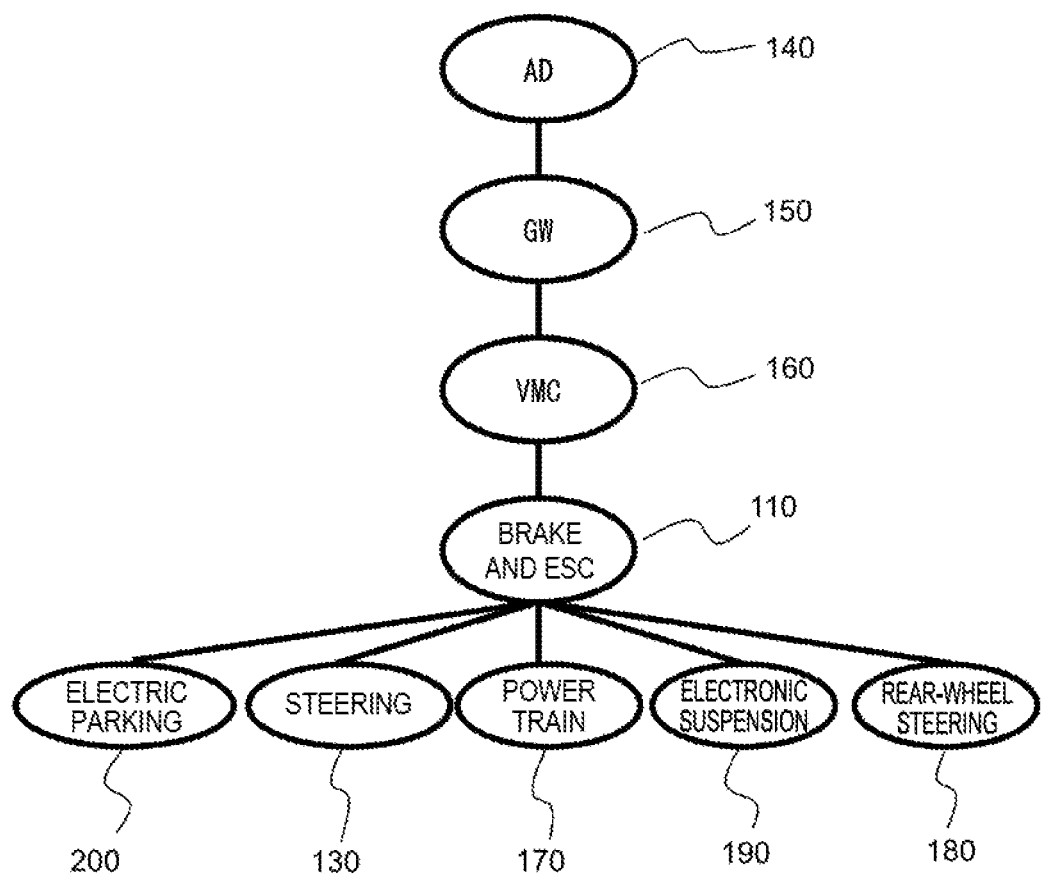
FIG. 3 illustrates one embodiment of a hierarchical structure of an autonomous driving control system.

FIG. 3 illustrates a hierarchical structure that is one embodiment of a hierarchical structure of the autonomous driving control system with the autonomous driving control apparatus (AD) 140 placed at the uppermost hierarchical layer, and is a minimum hierarchical structure in which a redundant arrangement is omitted at each hierarchical layer.

In this hierarchical structure illustrated in FIG. 3, the autonomous driving control apparatus 140 acquires the information regarding the target route and transmits this information regarding the target route to the vehicle motion control apparatus (VMC) 160 via the communication data gateway apparatus (GW) 150.

The vehicle motion control apparatus 160 inputs the information regarding the target route from the autonomous driving control apparatus 140, and also inputs the signal from the ESC (a first control portion) of the vehicle braking apparatus 110 and determines the target state of the vehicle 100 for achieving the target route.

The vehicle motion control apparatus 160 transmits the information regarding the target state of the vehicle 100 to the power steering control apparatus 130, the power train control apparatus 170, the rear-wheel steering control apparatus 180, the electronically-controlled suspension control apparatus 190, and the electric parking brake control apparatus 200, besides the vehicle braking apparatus 110.

In this hierarchical structure, when an abnormality has occurred in any of the hierarchical layers from the autonomous driving control apparatus 140 to the vehicle braking apparatus 110 (ESC), the actuator control becomes impossible and the entire system ends up in a failed state.

Figure 4:
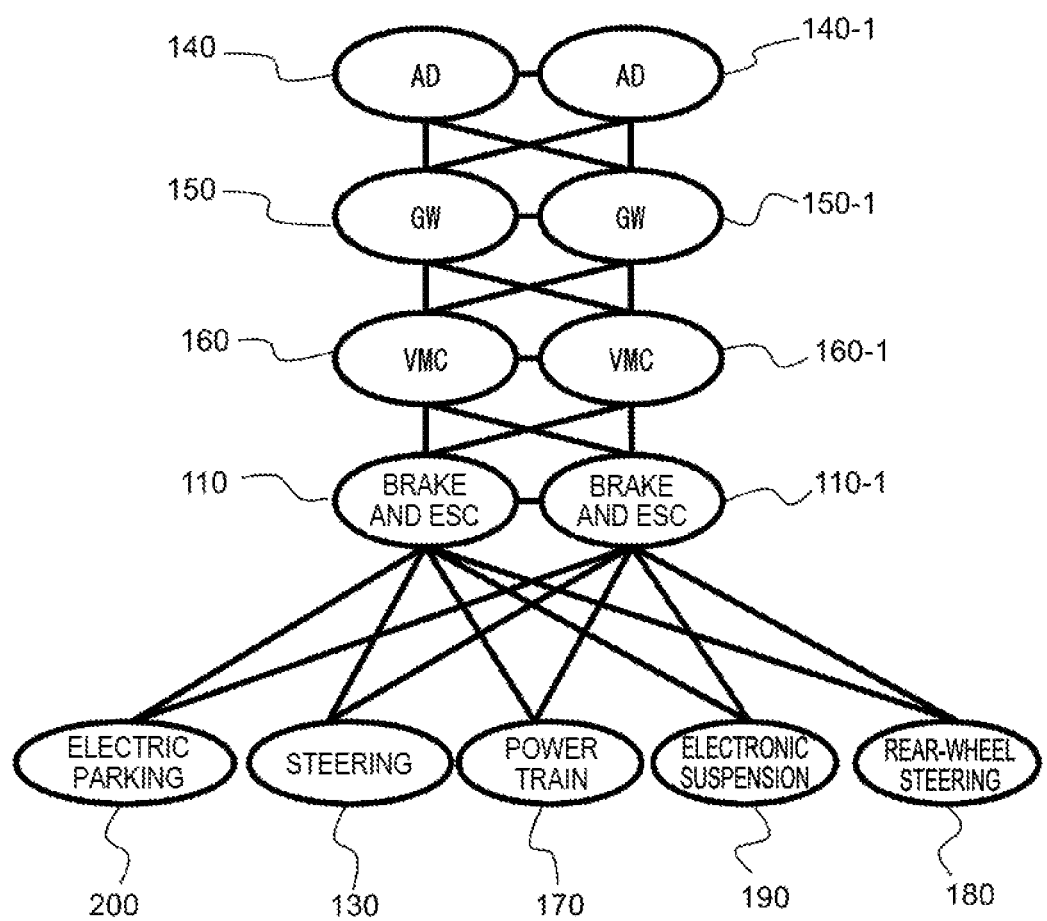
FIG. 4 illustrates one embodiment of the hierarchical structure of the autonomous driving control system.

On the other hand, FIG. 4 illustrates a hierarchical structure constructed by employing a redundant arrangement (preparing two systems) for each of the hierarchical layers from the autonomous driving control apparatus 140 to the vehicle braking apparatus 110 (ESC) in the hierarchical structure of the autonomous driving control system illustrated in FIG. 3.

According to the hierarchical structure illustrated in FIG. 4, the redundant arrangement is employed for each of the hierarchical layers from the autonomous driving control apparatus 140 to the vehicle braking apparatus 110 (ESC). Therefore, even when an abnormality has occurred in any of the hierarchical layers from the autonomous driving control apparatus 140 to the vehicle braking apparatus 110 (ESC), the backup function (an alternative function) works to allow the autonomous driving control system to calculate the information regarding the target route and calculate the target state of the vehicle 100 without any delay, thereby allowing it to continue the autonomous driving.

However, although employing the redundant arrangement for all of the individual hierarchical layers from the autonomous driving control apparatus 140 to the vehicle braking apparatus 110 (ESC) improves the reliability, this leads to an increase in the system cost and also leads to an increase in the space for installing each of the control units.

Figure 5:
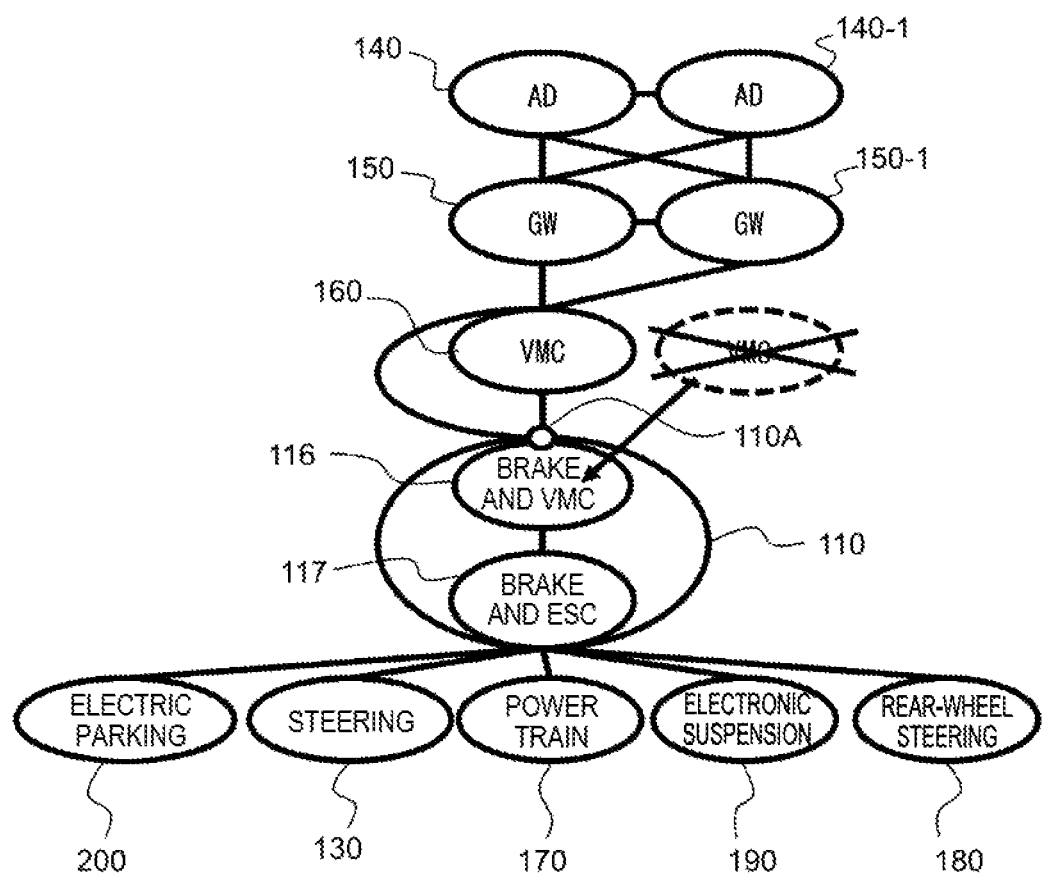
FIG. 5 illustrates one embodiment of the hierarchical structure when a VMC function for backup is provided to a first braking control device of a vehicle braking apparatus.

FIG. 5 illustrates a hierarchical structure capable of reducing the system cost and saving the space for installing the control units.

In this structure, the electronic control apparatus of the vehicle braking apparatus 110 includes two systems, the first braking control device 116 and the second braking control device 117, and has the redundant arrangement therein.

Therefore, reliability equivalent to the hierarchical structure illustrated in FIG. 4 can be acquired by employing the redundant arrangement for the autonomous driving control apparatus 140, the communication data gateway apparatus 150, and the vehicle motion control apparatus 160 (VMC).

However, employing the redundant arrangement for all of the autonomous driving control apparatus 140, the communication data gateway apparatus 150, and the vehicle motion control apparatus 160 (VMC) raises a problem of leading to an increase in the system cost and also leading to an increase in the space for installing each of the control units.

Therefore, as illustrated in FIG. 5, the redundant arrangement is employed for the autonomous driving control apparatus 140 and the communication data gateway apparatus 150, but only one system is prepared as the vehicle motion control apparatus 160 without the redundant arrangement employed therefor.

Then, the function of determining the target state of the vehicle 100 by the vehicle motion control apparatus 160 (hereinafter referred to as the VMC function) is provided to the first braking control device 116 (a second control portion or the second braking device) of the vehicle braking apparatus 110 as the arrangement for the backup instead of the two systems arranged (redundantly) as the vehicle motion control apparatus 160. By this configuration, the redundant arrangement is achieved for the VMC function due to the VMC function provided to the vehicle motion control apparatus 160 (a first vehicle motion control function) and the VMC function provided to the first braking control device 116 (a second vehicle motion control function).

On the other hand, the second braking control device 117 (the first control portion or the first braking device), which is the main control device of the vehicle braking apparatus 110, is not equipped with the VMC function and is equipped with the ESC function as software as described above.

The VMC function provided to the first braking control device 116 as software independently determines the target state of the vehicle 100 for achieving the target route based on the information regarding the target route that is input from the autonomous driving control apparatus 140 or the autonomous driving control apparatus 140-1 serving as the autonomous driving controller, and the physical amount regarding the driving state of the vehicle 100 that is input from the vehicle motion state detection sensor 220.

Now, the vehicle braking apparatus 110 includes an input portion 110A, which inputs the information regarding the target state of the vehicle 100 that is determined by the vehicle motion control apparatus 160 (the vehicle motion control controller).

Then, when the vehicle motion control apparatus 160 is normal, the first braking control device 116 and the second braking control device 117 of the vehicle braking apparatus 110 control the braking force as the driving state of the vehicle based on the information regarding the target state that is input from the input portion 110A.

Further, when the vehicle motion control apparatus 160 is normal, the vehicle control apparatuses (the actuator control apparatuses) at the lower hierarchical layers, such as the power steering control apparatus 130, also perform the actuator control based on the information regarding the target state of the vehicle 100 that is determined by the vehicle motion control apparatus 160.

On the other hand, when the vehicle motion control apparatus 160 is abnormal, the first braking control device 116 and the second braking control device 117 of the vehicle braking apparatus 110 perform the braking control based on the information regarding the target state of the vehicle 100 that is determined by the VMC function of the first braking control device 116 (the backup device for the vehicle motion control apparatus 160) instead of the information regarding the target state that is input from the input portion 110A (the information regarding the target state that is determined by the vehicle motion control apparatus 160).

Further, when the vehicle motion control apparatus 160 is abnormal, the vehicle control apparatuses at the lower hierarchical layers, such as the power steering control apparatus 130, also perform the actuator control based on the information regarding the target state of the vehicle 100 that is determined by the first braking control device 116.

According to this configuration, the autonomous driving control system can continue the autonomous driving and safely stop the vehicle 100 even when an abnormality has occurred in the vehicle motion control apparatus 160 during the autonomous driving of the vehicle 100.

The abnormality in the vehicle motion control apparatus 160 means an abnormality in the VMC function of the vehicle motion control apparatus 160 (the first vehicle motion control function).

Examples of the abnormality in the VMC function include being unable to correctly determine the target vehicle state based on the information regarding the target route and being unable to transmit the information indicating the target vehicle state to the actuator control apparatuses (the vehicle control apparatuses) at the lower hierarchical layers, such as the vehicle braking apparatus 110, due to an abnormality in the calculation function, the input/output function (the communication function), or the like.

Further, the autonomous driving control system can be configured in such a manner that the VMC function provided to the first braking control apparatus 116 functions when the VMC function of the vehicle motion control apparatus 160 is abnormal.

For example, when a result of self-diagnosis of the vehicle motion control apparatus 160 indicates an abnormality, the first braking control apparatus 116 can calculate the target state by its own VMC function. Alternatively, the first braking control apparatus 116 can calculate the target state by its own VMC function when diagnosing whether the vehicle motion control apparatus 160 is abnormal and determining that the vehicle motion control apparatus 160 is abnormal.

However, when the first braking control device 116 can still afford to bear a further calculation load, such as when the VMC function provided to the first braking control device 116 is limited to just the minimum function, the autonomous driving control system can calculate the target state by the first braking control device 116 even when the vehicle motion control apparatus 160 is normal by causing the VMC function of the first braking control device 116 to constantly operate.

Figure 6:
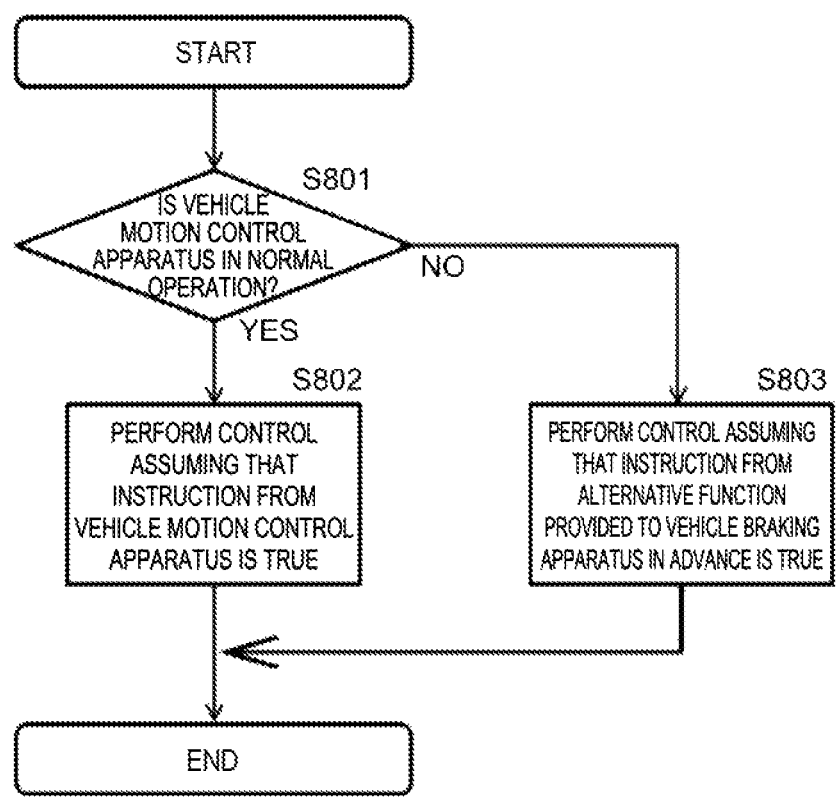
FIG. 6 is a flowchart illustrating processing for selecting the VMC function.

A flowchart illustrated in FIG. 6 indicates processing for selecting an instruction for the target vehicle state according to whether an abnormality has occurred in the vehicle motion control apparatus 160, which is performed by the first braking control device 116.

First, the first braking control device 116 determines whether the VMC function of the vehicle motion control apparatus 160 has an abnormality therein or is in normal operation (step S801).

The first braking control device 116 can determine whether an abnormality has occurred in the vehicle motion control apparatus 160 based on an output signal from a monitoring device provided to the vehicle motion control apparatus 160.

Alternatively, the first braking control device 116 can have a function of diagnosing whether an abnormality has occurred in the vehicle motion control apparatus 160.

If the vehicle motion control apparatus 160 is normal, the first braking control device 116 sets the execution of the actuator control based on the target vehicle state determined by the vehicle motion control apparatus 160 (i.e., the VMC function provided to the vehicle motion control apparatus 160) (step S802).

In other words, if the vehicle motion control apparatus 160 is normal, the first braking control device 116 causes the various kinds of actuator control to be performed assuming that the information regarding the target vehicle state determined by the vehicle motion control apparatus 160 existing on the communication bus is true.

On the other hand, If the vehicle motion control apparatus 160 is abnormal, the first braking control device 116 sets the execution of the actuator control based on the target vehicle state determined by the first braking control device 116 itself independently (i.e., the VMC function provided to the first braking control device 116) (step S803). In other words, if the vehicle motion control apparatus 160 is abnormal, the first braking control device 116 does not adopt the information regarding the target vehicle state determined by the vehicle motion control apparatus 160 existing on the communication bus, and causes the various kinds of actuator control to be performed assuming that the information regarding the target vehicle state determined by the VMC function provided to the first braking control device 116 is true.

The hierarchical structure of the autonomous driving control system illustrated in FIG. 5, i.e., the system configuration using the first braking control device 116 of the vehicle braking apparatus 110 as the redundant apparatus for the vehicle motion control apparatus 160 can prevent the complication of the redundant system while keeping the reliability at an equivalent level, compared to when the redundant arrangement is employed for the vehicle motion control apparatus 160 by preparing two systems as it.

More specifically, preparing only one system as the vehicle motion control apparatus 160 can contribute to reducing the number of control units installed on the vehicle 100 and reducing the system cost and the space for installing the control units.

Further, the vehicle braking apparatus 110 and the VMC function are highly compatible with each other because many of the signals input to the VMC function are fed from the ESC of the vehicle braking apparatus 110 (the signals of, for example, the yaw rate and the wheel speed) and the redundant arrangement is employed for the braking control apparatus to ensure the reliability in the autonomous driving.

Therefore, the redundant arrangement of the VMC function can be easily realized by providing the VMC function to the first braking control device 116.

The VMC function is provided to the first braking control device 116 prepared for the backup out of the two braking control device systems of the vehicle braking apparatus 110 in the hierarchical structure illustrated in FIG. 5, but the VMC function can be provided to the second braking control device 117, which is the main braking control device having the ESC function.

However, the first braking control device 116 is in charge of control having simpler contents and subjected to a lighter calculation load compared to the second braking control device 117 in charge of the ESC function, and therefore affords to and is competent to undertake the VMC function.

Therefore, providing the VMC function to the first braking control device 116 can realize the VMC function for the backup (the alternative function) without enhancing the capability of the microcomputer.

In sum, in the vehicle braking apparatus 110, the second braking control device 117 mainly performs the braking control and the first braking control device 116 performs the braking control as the backup when an abnormality has occurred in the second braking control device 117. Therefore, the first braking control device 116 is kept approximately out of operation in a usual state that the second braking control apparatus 117 is normal.

This means that providing the VMC function to the first braking control apparatus 116 can facilitate the effective utilization of the hardware resources such as the CPU, as the first braking control device 116 prepared for the backup leaves extra room in the processing capacity thereof compared to the second braking control device 117 serving as the main control device.

Further, although a similar VMC function to the VMC function provided to the vehicle motion control apparatus 160 can be provided to the first braking control device 116 or the second braking control device 117 as the redundant function, the VMC function can be provided to the first braking control device 116 or the second braking control device 117 as the redundant function after being narrowed down to the minimum function in the VMC function provided to the vehicle motion control apparatus 160.

Further, the first braking control device 116 and the second braking control device 117 are mounted on individually separate substrates in the one embodiment illustrated in FIG. 2, respectively, but the microcomputer functioning as the first braking control device 116 (the main second control portion equipped with the VMC function) and the microcomputer functioning as the second braking control device 117 (the backup first control portion unequipped with the VMC function) can be mounted on one substrate.

Further, the control portion equipped with the VMC function as the redundant apparatus for the vehicle motion control apparatus 160 is not limited to the control portion redundantly prepared for the vehicle braking apparatus 110.

For example, the vehicle system illustrated in FIG. 1 can be configured as a system in which only one system is prepared as the vehicle motion control apparatus 160, with the VMC function (i.e., the backup function for the vehicle motion control apparatus 160) provided to one of redundantly arranged two control portions of any one of the power steering control apparatus 130, the power train control apparatus 170, the rear-wheel steering control apparatus 180, the electronically-controlled suspension control apparatus 190, and the electric parking brake control apparatus 200, which are the actuator control apparatuses integrally controlled by the autonomous driving control apparatus 140.

The redundantly arranged two control portions in the power steering control apparatus 130 or the like can be mounted on different substrates or can also be mounted on one substrate similarly to the vehicle braking apparatus 110.

Further, it is preferable that the control portion prepared for the backup is selected from the redundantly arranged two control portions as the control portion to which the VMC function for the backup is provided, although the VMC function can also be provided to the main control portion.

Figure 7:
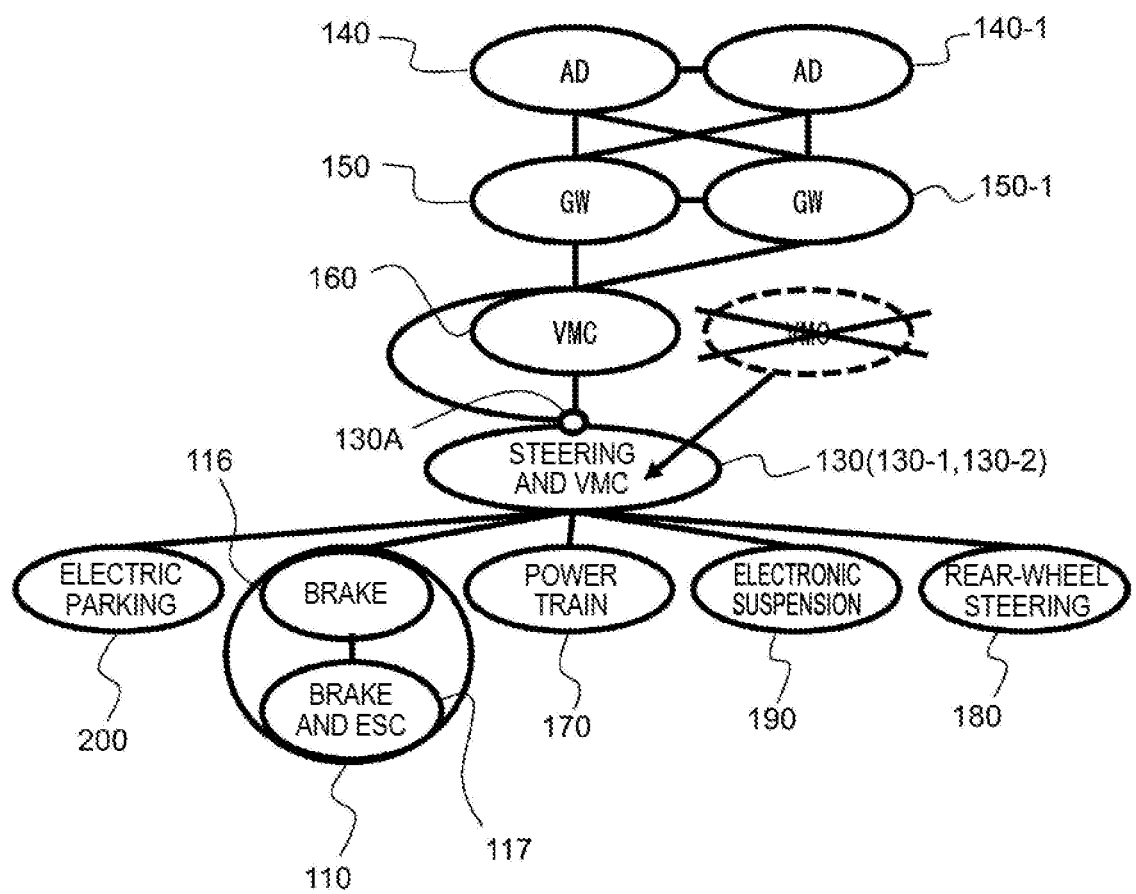
FIG. 7 illustrates one example of the hierarchical structure of the autonomous driving control system when the VMC function for backup is provided to a power steering control apparatus.

FIG. 7 illustrates the hierarchical structure of the autonomous driving control system when the VMC function as the function for the backup is provided to the power steering control apparatus 130.

The hierarchical structure illustrated in FIG. 7 is such a system that a first control portion 130-1 and a second control portion 130-2 are prepared as the redundant arrangement of the power steering control apparatus 130, and the VMC function as the function for the backup is provided to the second control portion 130-2 of them, while only one system is prepared as the vehicle motion control apparatus 160, instead of preparing the redundant apparatus for the vehicle motion control apparatus 160.

In the hierarchical structure illustrated in FIG. 7, the power steering control apparatus 130 includes an input portion 130A, which inputs the information regarding the target state of the vehicle 100 that is determined by the vehicle motion control apparatus 160.

Then, when the vehicle motion control apparatus 160 is normal, the power steering control apparatus 130 controls the steering angle as the motion state of the vehicle 100 based on the target state of the vehicle 100 that is input from the input portion 130A.

Further, the power train control apparatus 170, the rear-wheel steering control apparatus 180, the electronically-controlled suspension control apparatus 190, the electric parking brake control apparatus 200, and the vehicle braking apparatus 110, which are the actuator control apparatuses placed at hierarchical layers below the power steering control apparatus 130, also control the driving states of the vehicle 100 such as the driving force, the rear-wheel steering, and the braking force based on the information regarding the target state of the vehicle 100 that is determined by the vehicle motion control apparatus 160.

On the other hand, when the vehicle motion control apparatus 160 is abnormal, the power steering control apparatus 130 controls the steering angle as the motion state of the vehicle 100 based on the information regarding the target state of the vehicle 100 that is determined by the backup VMC function provided to the second control portion 130-2.

Further, the power train control apparatus 170, the rear-wheel steering control apparatus 180, the electronically-controlled suspension control apparatus 190, the electric parking brake control apparatus 200, and the vehicle braking apparatus 110, which are the actuator control apparatuses placed at the hierarchical layers below the power steering control apparatus 130, also control the driving states of the vehicle 100 such as the driving force, the rear-wheel steering, and the braking force based on the information regarding the target state of the vehicle 100 that is determined by the backup VMC function provided to the second control portion 130-2 of the power steering control apparatus 130.

Figure 8:
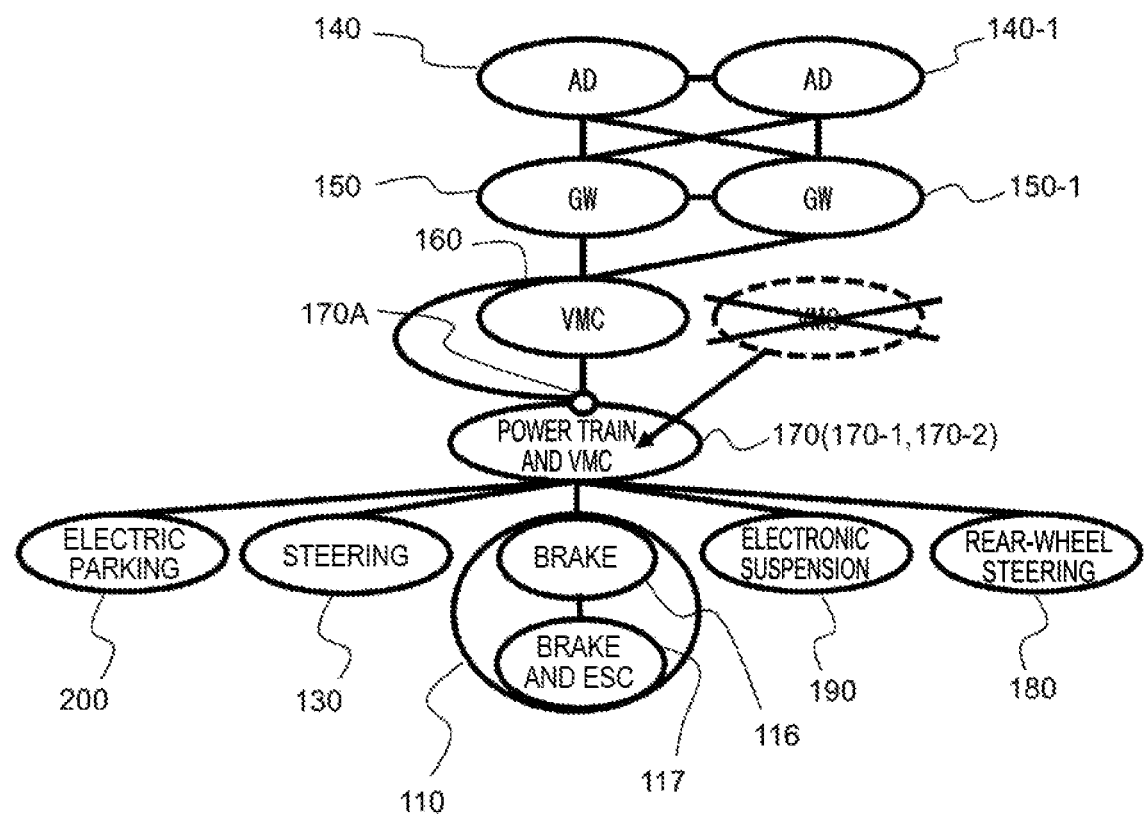
FIG. 8 illustrates one example of the hierarchical structure of the autonomous driving control system when the VMC function for backup is provided to a power train control apparatus.

FIG. 8 illustrates the hierarchical structure of the autonomous driving control system when the VMC function as the function for the backup is provided to the power train control apparatus 170.

The hierarchical structure illustrated in FIG. 8 is such a system that a first control portion 170-1 and a second control portion 170-2 are prepared as the redundant arrangement of the power train control apparatus 170, and the VMC function as the function for the backup is provided to the second control portion 170-2 of them, while only one system is prepared as the vehicle motion control apparatus 160, instead of preparing the redundant apparatus for the vehicle motion control apparatus 160.

In the hierarchical structure illustrated in FIG. 8, the power train control apparatus 170 includes an input portion 170A, which inputs the information regarding the target state of the vehicle 100 that is determined by the vehicle motion control apparatus 160.

Then, when the vehicle motion control apparatus 160 is normal, the actuator control apparatuses including the power train control apparatus 170 control the driving states of the vehicle 100 such as the driving force, the rear-wheel steering, the braking force, and the steering angle, respectively, based on the information regarding the target state of the vehicle 100 that is determined by the vehicle motion control apparatus 160 (the VMC function).

On the other hand, when the vehicle motion control apparatus 160 is abnormal, the actuator control apparatuses including the power train control apparatus 170 control the driving states of the vehicle 100 such as the driving force, the rear-wheel steering, the braking force, and the steering angle, respectively, based on the information regarding the target state of the vehicle 100 that is determined by the backup VMC function provided to the second control portion 170-2 of the power train control apparatus 170.

Figure 9:
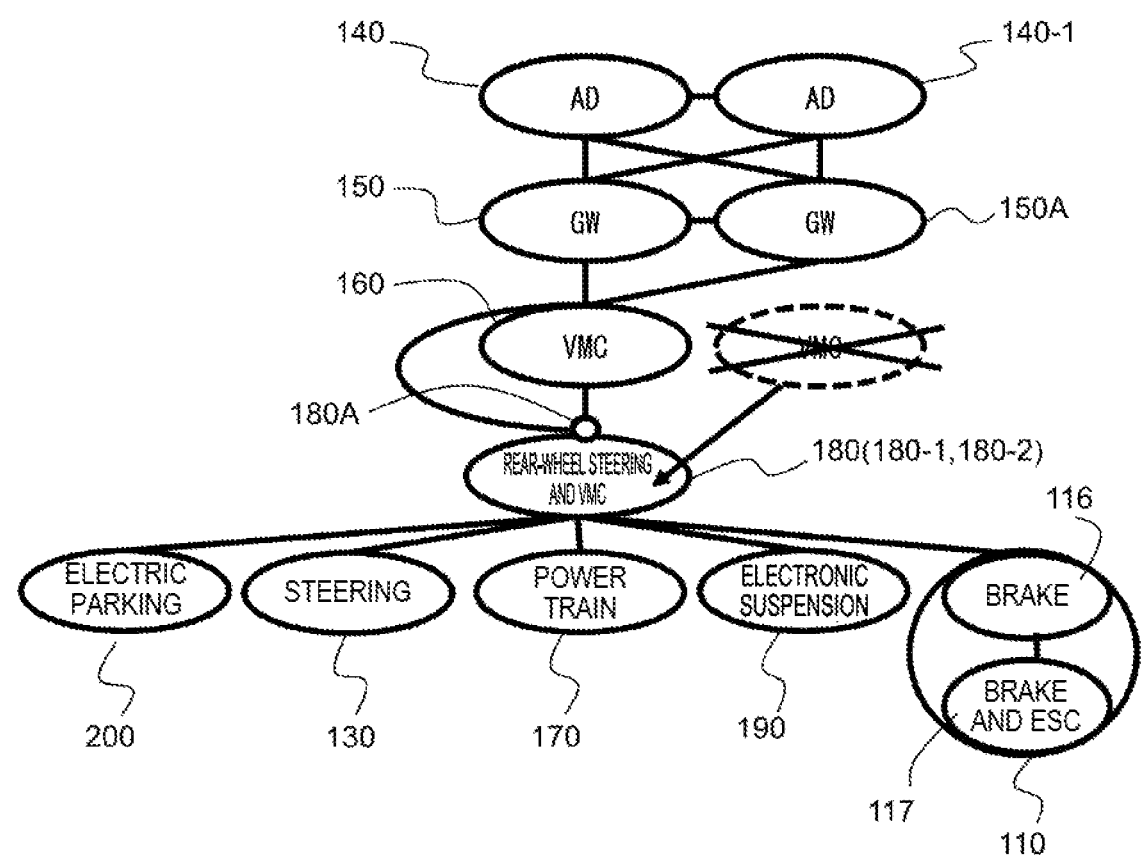
FIG. 9 illustrates one example of the hierarchical structure of the autonomous driving control system when the VMC function for backup is provided to a rear-wheel steering control apparatus.

FIG. 9 illustrates the hierarchical structure of the autonomous driving control system when the VMC function as the function for the backup is provided to the rear-wheel steering control apparatus 180.

The hierarchical structure illustrated in FIG. 9 is such a system that a first control portion 180-1 and a second control portion 180-2 are prepared as the redundant arrangement of the rear-wheel steering control apparatus 180, and the VMC function as the function for the backup is provided to the second control portion 180-2 of them, while only one system is prepared as the vehicle motion control apparatus 160, instead of preparing the redundant apparatus for the vehicle motion control apparatus 160.

In the hierarchical structure illustrated in FIG. 9, the rear-wheel steering control apparatus 180 includes an input portion 180A, which inputs the information regarding the target state of the vehicle 100 that is determined by the vehicle motion control apparatus 160.

Then, when the vehicle motion control apparatus 160 is normal, the actuator control apparatuses including the rear-wheel steering control apparatus 180 control the driving states of the vehicle 100 such as the driving force, the rear-wheel steering, the braking force, and the steering angle, respectively, based on the information regarding the target state of the vehicle 100 that is determined by the vehicle motion control apparatus 160 (the VMC function).

On the other hand, when the vehicle motion control apparatus 160 is abnormal, the actuator control apparatuses including the rear-wheel steering control apparatus 180 control the driving states of the vehicle 100 such as the driving force, the rear-wheel steering, the braking force, and the steering angle, respectively, based on the information regarding the target state of the vehicle 100 that is determined by the backup VMC function provided to the second control portion 180-2 of the rear-wheel steering control apparatus 180.

Figure 10:
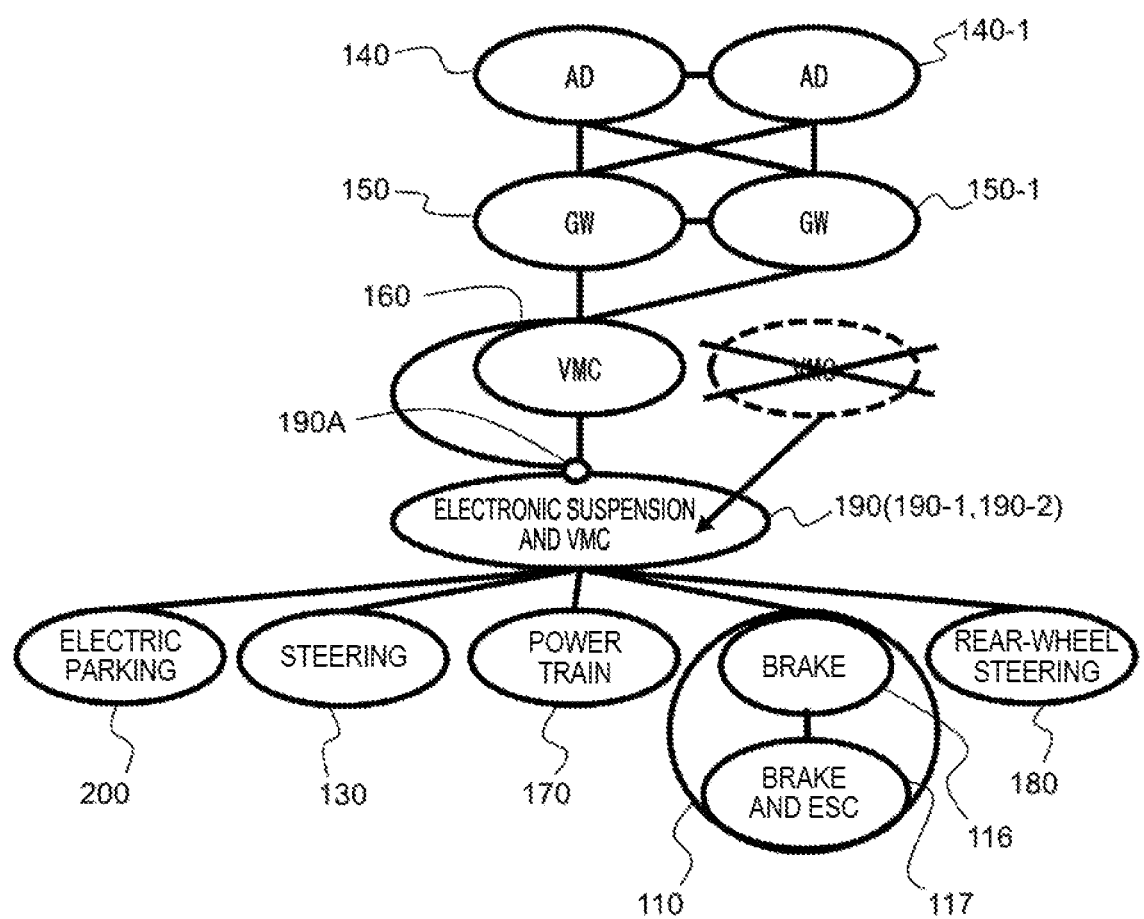
FIG. 10 illustrates one example of the hierarchical structure of the autonomous driving control system when the VMC function for backup is provided to an electronically-controlled suspension control apparatus.

FIG. 10 illustrates the hierarchical structure of the autonomous driving control system when the VMC function as the function for the backup is provided to the electronically-controlled suspension control apparatus 190.

The hierarchical structure illustrated in FIG. 10 is such a system that a first control portion 190-1 and a second control portion 190-2 are prepared as the redundant arrangement of the electronically-controlled suspension control apparatus 190, and the VMC function as the function for the backup is provided to the second control portion 190-2 of them, while only one system is prepared as the vehicle motion control apparatus 160, instead of preparing the redundant apparatus for the vehicle motion control apparatus 160.

In the hierarchical structure illustrated in FIG. 10, the electronically-controlled suspension control apparatus 190 includes an input portion 190A, which inputs the information regarding the target state of the vehicle 100 that is determined by the vehicle motion control apparatus 160.

Then, when the vehicle motion control apparatus 160 is normal, the actuator control apparatuses including the electronically-controlled suspension control apparatus 190 control the driving states of the vehicle 100 such as the driving force, the rear-wheel steering, the braking force, and the steering angle, respectively, based on the information regarding the target state of the vehicle 100 that is determined by the vehicle motion control apparatus 160 (the VMC function).

On the other hand, when the vehicle motion control apparatus 160 is abnormal, the actuator control apparatuses including the electronically-controlled suspension control apparatus 190 control the driving states of the vehicle 100 such as the driving force, the rear-wheel steering, the braking force, and the steering angle, respectively, based on the information regarding the target state of the vehicle 100 that is determined by the backup VMC function provided to the second control portion 190-2 of the electronically-controlled suspension control apparatus 190.

Figure 11:
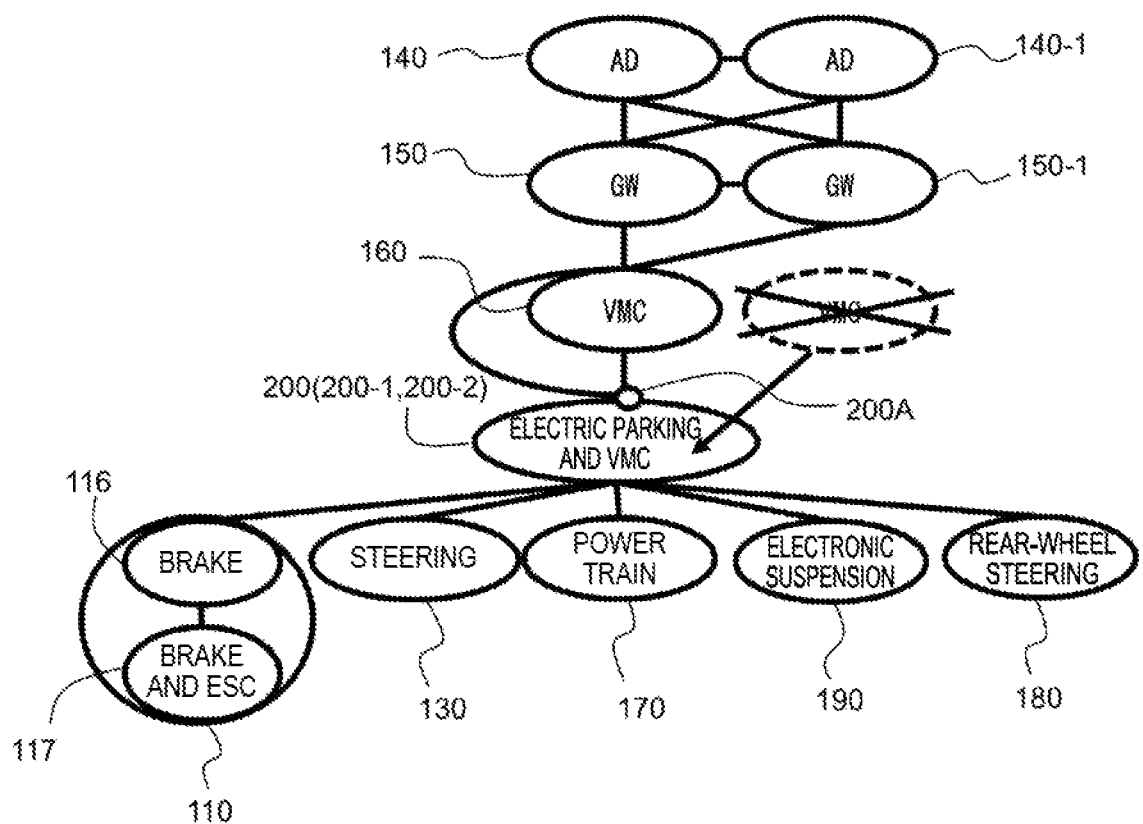
FIG. 11 illustrates one example of the hierarchical structure of the autonomous driving control system when the VMC function for backup is provided to an electric power braking control apparatus.

FIG. 11 illustrates the hierarchical structure of the autonomous driving control system when the VMC function as the function for the backup is provided to the electric parking brake control apparatus 200.

The hierarchical structure illustrated in FIG. 11 is such a system that a first control portion 200-1 and a second control portion 200-2 are prepared as the redundant arrangement of the electric parking brake control apparatus 200, and the VMC function as the function for the backup is provided to the second control portion 200-2 of them, while only one system is prepared as the vehicle motion control apparatus 160, instead of preparing the redundant apparatus for the vehicle motion control apparatus 160.

In the hierarchical structure illustrated in FIG. 11, the electric parking brake control apparatus 200 includes an input portion 200A, which inputs the information regarding the target state of the vehicle 100 that is determined by the vehicle motion control apparatus 160.

Then, when the vehicle motion control apparatus 160 is normal, the actuator control apparatuses including the electric parking brake control apparatus 200 control the driving states of the vehicle 100 such as the driving force, the rear-wheel steering, the braking force, and the steering angle, respectively, based on the information regarding the target state of the vehicle 100 that is determined by the vehicle motion control apparatus 160 (the VMC function).

On the other hand, when the vehicle motion control apparatus 160 is abnormal, the actuator control apparatuses including the electric parking brake control apparatus 200 control the driving states of the vehicle 100 such as the driving force, the rear-wheel steering, the braking force, and the steering angle, respectively, based on the information regarding the target state of the vehicle 100 that is determined by the backup VMC function provided to the second control portion 200-2 of the electric parking brake control apparatus 200.

Each of the configurations described in the above-described embodiments can be arbitrarily combined within a range not creating a contradiction.

Having described the contents of the present invention specifically with reference to the preferred embodiments thereof, it is apparent to those skilled in the art that the present invention can be embodied by various modifications based on the basic technical idea and teaching of the present invention.

For example, the vehicle system can be configured as a vehicle control system that integrates the autonomous driving control apparatus 140 and the vehicle motion control apparatus 160 and includes them as one control apparatus.

Further, the vehicle braking apparatus 110 can include two control portions having similar braking control functions and have the VMC function for the backup in one (the second control portion) of these two control portions.

Further, the vehicle control apparatus (the actuator control apparatus) including the control portion equipped with the VMC function for the backup is not limited to the vehicle control apparatuses 110, 130, 170, 180, 190, and 200 illustrated in FIG. 1.

Further, the VMC function of the vehicle motion control apparatus 160 can be provided to each of a plurality of actuator control apparatuses as the function for the backup.

Further, when an abnormality has occurred in the VMC function of the vehicle motion control apparatus 160 and the autonomous driving is carried out by the VMC function for the backup that is provided to the actuator control apparatus, a warning can be issued to notify the driver of the vehicle 100 of the abnormality in the autonomous driving function.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority under the Paris Convention to Japanese Patent Application No. 2018-43953 filed on Mar. 12, 2018. The entire disclosure of Japanese Patent Application No. 2018-43953 filed on Mar. 12, 2018 including the specification, the claims, the drawings, and the abstract is incorporated herein by reference in its entirety.

REFERENCE SIGNS LIST 100 vehicle
110 vehicle braking apparatus (brake control apparatus, vehicle control apparatus)
110A input portion
114 first hydraulic unit (second braking device)
115 second hydraulic unit (first braking device)
116 first braking control device (second control portion)
117 second braking control device (first control portion)
140 autonomous driving control apparatus (autonomous driving controller)
160 vehicle motion control apparatus (vehicle motion control controller)
220 vehicle motion state detection sensor

The invention claimed is:

1. A vehicle control apparatus comprising:
an input portion configured to receive an input of information regarding a target state of a vehicle from a vehicle motion control controller equipped with a first vehicle motion control function, the first vehicle motion control function being configured to determine the target state of the vehicle for achieving a target route of the vehicle based on information regarding the target route of the vehicle that is input from an autonomous driving controller and a physical amount regarding a motion state of the vehicle that is input from a vehicle motion state detection sensor;
a first control portion configured to control the motion state of the vehicle based on the target state of the vehicle that is input from the input portion; and
a second control portion equipped with a second vehicle motion control function, the second vehicle motion control function being configured to determine the target state of the vehicle for achieving the target route of the vehicle based on the information regarding the target route of the vehicle that is input from the autonomous driving controller and the physical amount regarding the motion state of the vehicle that is input from the vehicle motion state detection sensor, the second control portion being configured to control the motion state of the vehicle based on the target state of the vehicle that is input from the input portion,
wherein the first control portion controls a braking force to be generated on a wheel of the vehicle among motion states, each of which is the motion state of the vehicle, and
wherein the second control portion controls the braking force to be generated on the wheel of the vehicle among the motion states, each of which is the motion state of the vehicle,
the vehicle control apparatus further comprising:
a first braking device equipped with the first control portion; and
a second braking device equipped with the second control portion.

2. The vehicle control apparatus according to claim 1, wherein the second control portion is used as a backup for the first control portion.

3. The vehicle control apparatus according to claim 1, wherein the first control portion and the second control portion control the motion state of the vehicle based on the target state of the vehicle that is determined by the second vehicle motion control function when the first vehicle motion control function is abnormal.

4. The vehicle control apparatus according to claim 1, wherein the second vehicle motion control function is configured to function when the first vehicle motion control function is abnormal.

5. A vehicle control method for controlling a braking force to be generated on a wheel of a vehicle by means of a first control portion equipped in a first braking device and a second control portion equipped in a second braking device comprising:
controlling the braking force to be generated on the wheel of the vehicle by means of the first control portion and the second control portion based on information regarding a target state of a vehicle that is input from a vehicle motion control controller equipped with a first vehicle motion control function, the first vehicle motion control function being configured to determine the target state of the vehicle for achieving a target route of the vehicle based on information regarding the target route of the vehicle that is input from an autonomous driving controller and a physical amount regarding the motion state of the vehicle that is input from a vehicle motion state detection sensor; and controlling the braking force to be generated on the wheel of the vehicle by means of the first control portion and the second control portion based on the information regarding the target state of the vehicle that is determined by a second vehicle motion control function when the first vehicle motion control function is abnormal, the second vehicle motion control function being provided to the second control portion, the second vehicle motion control function being configured to determine the target state of the vehicle for achieving the target route of the vehicle based on the information regarding the target route of the vehicle that is input from the autonomous driving controller and the physical amount regarding the motion state of the vehicle that is input from the vehicle motion state detection sensor.

6. The vehicle control method according to claim 5, wherein the vehicle control apparatus is a vehicle control apparatus configured to control a braking force to be generated on a wheel of the vehicle among motion states, each of which is the motion state of the vehicle.

7. A vehicle control system comprising:
an autonomous driving controller configured to acquire information regarding a target route of a vehicle;
a vehicle motion state detection sensor configured to detect a physical amount regarding a motion state of the vehicle;
a vehicle motion control controller equipped with a first vehicle motion control function, the first vehicle motion control function being configured to determine a target state of the vehicle for achieving the target route of the vehicle based on the information regarding the target route of the vehicle that is input from the autonomous driving controller and the physical amount regarding the motion state of the vehicle that is input from the vehicle motion state detection sensor; and
a vehicle control apparatus configured to control the motion state of the vehicle based on the target state of the vehicle that is input from the vehicle motion control controller,
wherein the vehicle control apparatus includes
a first control portion configured to control the motion state of the vehicle, and
a second control portion equipped with a second vehicle motion control function, the second vehicle motion control function being configured to determine the target state of the vehicle for achieving the target route of the vehicle based on the information regarding the target route of the vehicle that is input from the autonomous driving controller and the physical amount regarding the motion state of the vehicle that is input from the vehicle motion state detection sensor, the second control portion being configured to control the motion state of the vehicle,
wherein the first control portion controls a braking force to be generated on a wheel of the vehicle among motion states, each of which is the motion state of the vehicle,
wherein the second control portion controls the braking force to be generated on the wheel of the vehicle among the motion states, each of which is the motion state of the vehicle, and
wherein the vehicle control apparatus further includes
a first braking device equipped with the first control portion; and
a second braking device equipped with the second control portion.

* * * * *